S. J. SHERMAN.
Spirit Level.
No. 374. Reissued July 1, 1856.
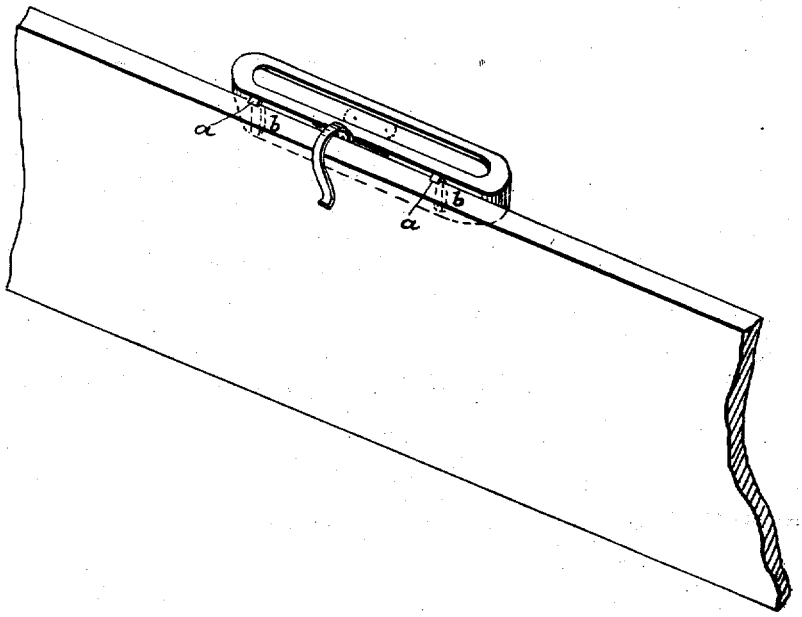
N. PETERS, Photo-Lithographer, Washington, D. C.

UNITED STATES PATENT OFFICE.

S. I. SHERMAN, OF NEW YORK, N. Y.

IMPROVEMENT IN SPIRIT-LEVELS.

Specification forming part of Letters Patent No. 9,867, dated July 19, 1853; Reissue No 374, dated July 1, 1856.

*To all whom it may concern:*

Be it known that I, SYLVESTER I. SHERMAN, of the city, county, and State of New York, have invented a new and useful Improvement in Levels for the use of Mechanics; and I do hereby declare that the following is a full, clear, and exact description of the same, reference being had to the annexed drawing, making a part of this specification, which is a view in perspective of my invention as applied.

My invention consists in the combination of a spring-catch with the usual spirit-level, to enable it to be readily attached to the edges of squares, rulers, and other tools or implements of the artisan, for ascertaining vertical, horizontal, or other right lines. Thus one spirit-level can be made to subserve the purposes of many, and thus, too, the insertion, as a fixture, of such in the tools above named is rendered unnecessary. In constructing my level I make the box as usual, one side truly planed below the projecting bearers *a*. At *b*, I fasten a spring-catch, having one end bent at an angle outward from the instrument, as clearly shown.

To apply the instrument to a square or ruler, press the edge within the spring and force it up against the side of the level until the bearers *a* both rest upon said edge, as seen in the figure, and if the edge be straight a truly horizontal line may be found. The instrument is retained in place by the adhesion produced by the pressure of the spring.

Other known means of fastening may be substituted for the spring-catch without altering the character of my improvement; but I prefer the spring-catch as the most simple.

What I claim as my invention, and desire to secure by Letters Patent, is—

The spring-catch (or known equivalent thereof in this combination) to hold the level in place upon the square or ruler, in combination with the bearers, the latter being so formed in respect to the level that when they are placed upon a horizontal line the bubble will be in the middle of the glass, and thus a horizontal or a vertical line may be ascertained from a ruler or from a square when said level is attached, substantially as herein set forth.

S. I. SHERMAN.

Witnesses:

CHAS. G. PAGE,

R. T. CAMPBELL.